United States Patent [19]

Bauer

[11] Patent Number: 4,725,081
[45] Date of Patent: Feb. 16, 1988

[54] DETACHABLE PLUG ASSEMBLY

[75] Inventor: Herman Bauer, Ebern, Fed. Rep. of Germany

[73] Assignee: FAG Kugelfischer Georg Schafer (KGaA), Fed. Rep. of Germany

[21] Appl. No.: 905,479

[22] Filed: Sep. 8, 1986

[30] Foreign Application Priority Data

Sep. 7, 1985 [DE] Fed. Rep. of Germany ....... 3531926

[51] Int. Cl.⁴ .............................................. F16L 21/06
[52] U.S. Cl. ..................................... 285/305; 285/321
[58] Field of Search ....................... 285/305, 321, 174

[56] References Cited

U.S. PATENT DOCUMENTS

| | | | |
|---|---|---|---|
| 3,127,199 | 3/1964 | Roe | 285/305 X |
| 3,314,696 | 4/1967 | Ferguson et al. | 285/174 |
| 3,565,464 | 2/1971 | Wolf | 285/321 X |
| 3,625,551 | 12/1971 | Branton | 285/305 |
| 3,628,768 | 12/1971 | Hutt | 285/305 X |
| 3,753,582 | 8/1973 | Graham | 285/305 |
| 4,009,896 | 3/1977 | Brewer | 285/305 |
| 4,059,295 | 11/1977 | Helm | 285/305 |
| 4,063,760 | 12/1977 | Moreiras | 285/321 X |

FOREIGN PATENT DOCUMENTS

| | | | |
|---|---|---|---|
| AS1525582 | 8/1975 | Fed. Rep. of Germany. | |
| 1294438 | 4/1962 | France | 285/305 |
| 745526 | 2/1956 | United Kingdom | 285/305 |
| 1230857 | 5/1971 | United Kingdom | 285/305 |
| 518598 | 6/1976 | U.S.S.R. | 285/305 |

OTHER PUBLICATIONS

DIN 74 234, Sep. 1974.
DIN 74 233, Oct. 1963.

Primary Examiner—Thomas F. Callaghan
Attorney, Agent, or Firm—Ostrolenk, Faber, Gerb & Soffen

[57] ABSTRACT

A detachable plug assembly for making a connection between a pipe and an external unit such as a hose fitting or hydraulic unit, for example, in which the pipe can be automatically locked in a well-defined axial position in a bore of the external unit, and thus be assembled in a short time on an assembly line, particularly in the case of assembly by robots, without requiring special tools for either assembly or disassembly. The assembly comprises a bushing which is mountable in a fixed axial position on the pipe, the bushing having a conical shoulder at a forward end thereof for axially engaging the bore of the external unit and centering the pipe therein. The external unit has slots through which project the free ends of a locking element. The free ends extend into the bore of the external unit and engage a groove in the bushing for retaining the pipe in the bore of the external unit.

4 Claims, 6 Drawing Figures

DETACHABLE PLUG ASSEMBLY

BACKGROUND OF THE INVENTION

1. Field of the Invention

The present invention relates to a detachable plug assembly for retaining a pipe in an external unit such as a hose fitting or hydraulic unit, and more particularly to an assembly wherein a bushing mounted on the pipe has at least one circumferential groove into which there engages, in mounted condition, a locking element mounted on the external unit which prevents unintended loosening of the connection.

2. Description of Related Art

DIN 74 234 and DIN 74 233 provide standards for the above-mentioned purposes, relative to pipes and their corresponding union nuts and union screws.

Using such parts requires suitable tools (such as wrenches) for both assembly and disassembly, so it takes a relatively long period of time to produce a dependable connection between a pipe and a hose fitting. The increased use of assembly-line manufacture and of robots, for instance in the manufacture of automobiles, requires the assembly of different individual parts in as few operating steps as possible.

Federal Republic of Germany Provisional Pat. No. AS 15 25 582 discloses a hose fitting in which a bushing is pushed over a brake hose and clamped fast by deforming the bushing. This bushing is then introduced into a corresponding counter-piece and locked axially by a U-shaped push-on clip. This arrangement has the disadvantage that precise axial positioning is not automatically obtained, but must be found by visual examination so that the push-on clip which prevents unintended loosening of the plug connection can be passed through the boreholes in the housing and engage the annular groove of the bushing. Furthermore, it is not possible to clamp the bushing firmly on a pipe without changing the cross-section of the pipe.

None of the solutions known from the prior art is therefore suitable for machine assembly of a plug-in connection.

SUMMARY OF THE INVENTION

Accordingly, a primary object of the present invention is to provide a detachable plug assembly for connecting a pipe to an external unit such as a hose fitting or hydraulic unit, for example, which can be assembled and disassembled in a simple manner without the use of special tools, and which can be put together by a machine.

A further object is for the individual parts of the assembly to be secured against loss when in separated condition.

These objects are achieved with a detachable plug assembly in which a bushing mounted on the pipe has a circumferential groove into which a locking element on the external unit engages when the pipe and bushing are inserted into a bore in the external unit. The bushing is fixed axially in position on the pipe by means of a bead on the pipe which engages an undercut in the bushing, and the bushing also has a conical shoulder for engaging the external unit bore. Free ends of the locking element are inserted into slots in the external unit and extend into the bore, automatically locking the bushing in precisely defined axial position in the bore, and the bushing is centered in the bore by the conical shoulder.

A particular advantage of the invention is that a dependable connection is produced by simply pushing the pipe and the hose fitting or unit connector together. Furthermore, the axial locking arrangement adjusts itself automatically upon each given push-in operation, thus avoiding any assembly problems due to unavoidable manufacturing tolerances. Disassembly can be effected just as simply without the use of any special tool, since it is assured that no part will be lost when they are separated.

BRIEF DESCRIPTION OF THE DRAWINGS

Other objects, features and advantages of the invention will be seen in the following detailed description of a preferred embodiment thereof, with reference to the drawings, in which.

DESCRIPTION OF PREFERRED EMBODIMENTS

Figure 1:
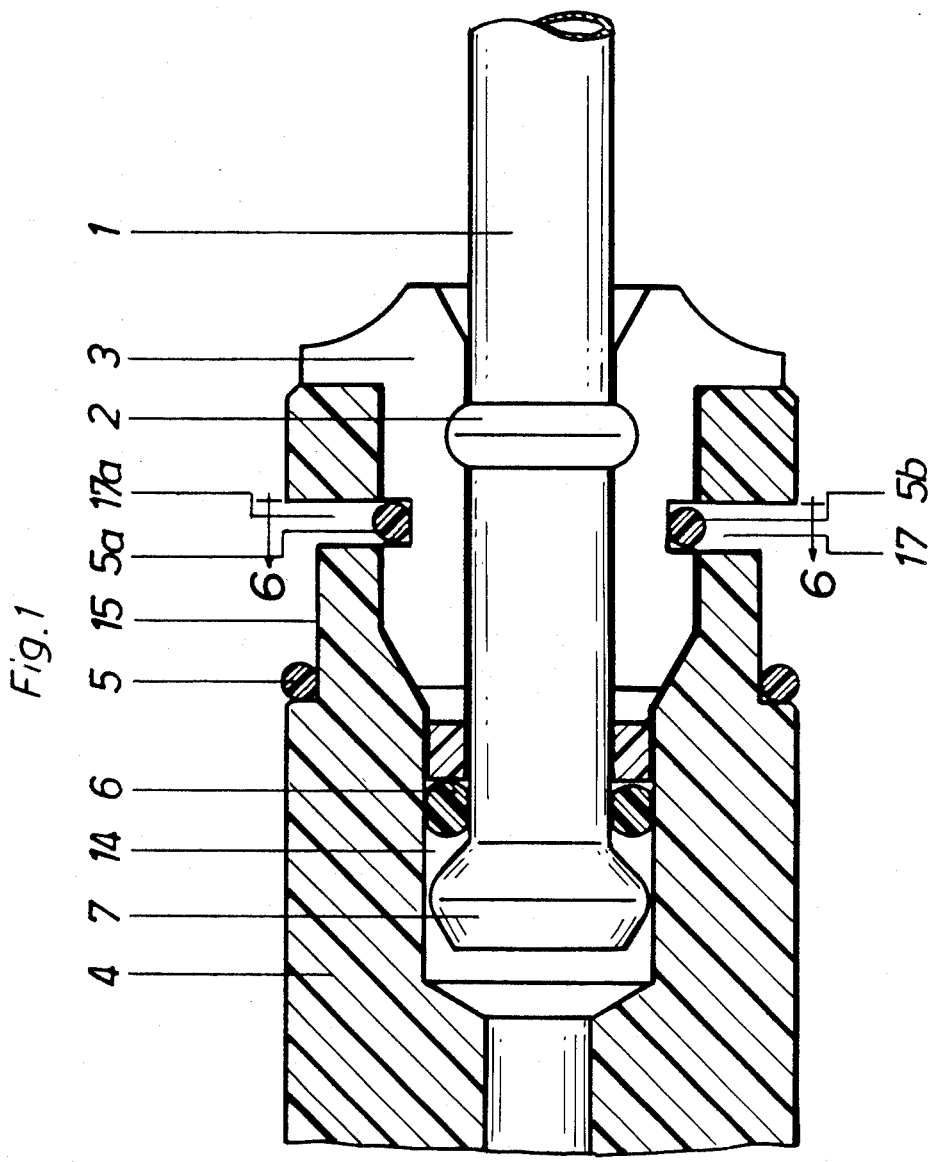
FIG. 1 is a longitudinal cross-section of a plug assembly interconnecting a pipe and a hydraulic unit connector.

FIG. 1 shows, in longitudinal section, a plug assembly according to a preferred embodiment of the invention. As seen in FIG. 1, the plug assembly is installed for interconnecting a pipe 1 and a hydraulic unit connector 4. The pipe 1 is provided with first and second beads 2 and 7, the second bead 7 being at a forward end of the pipe 1. A bushing 3 surrounds a portion of the pipe including the first bead 2. A sealing ring 6 is mounted around the pipe 1 between a forward end of the bushing 3 and the second bead 7. A locking element 5 having free ends 5a and 5b interconnects the hydraulic unit connector 4 and the bushing 3.

Figure 3:
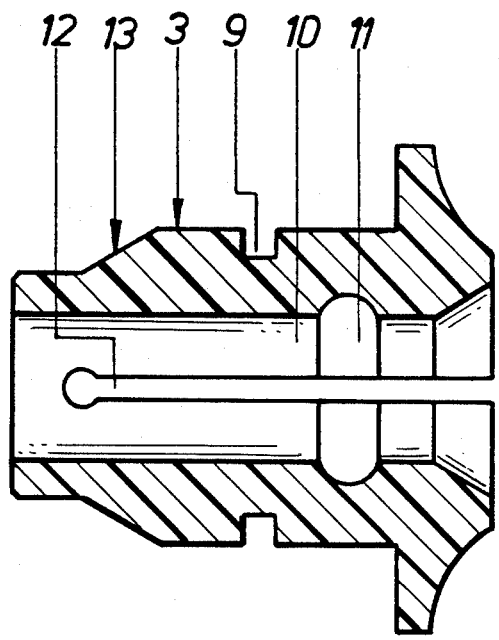
FIG. 3 is a longitudinal cross-section of a bushing for use in the assembly of FIG. 1.

Referring now to FIG. 3, which shows the bushing 3 in longitudinal section, the bushing 3 has a bore 10 which is sized to correspond to the outside diameter of the pipe 1. The bushing 3 is slid over the pipe 1—which initially has only the bead 2—until an undercut 11 of the bore engages the bead 2 in form-locked fashion. In order for the bushing 3 to expand elastically upon moving over the bead 2, it is slit along its longitudinal axis, as shown at 12. The bead 7 is applied to the pipe 1 only after the mounting of the bushing 3, and it serves to secure against losing the sealing ring 6 when the plug connection is disconnected.

On its end into which the pipe 1 is inserted, the unit connector 4 has an outer cut-down portion 15 surrounding a bore 14. Adjacent to the cut-down portion 15, two slots 17, 17a, are arranged on opposite sides of the unit connector 4, and extend into the bore 14. A locking element 5 is located against a shoulder created by the cut-down portion 15. The locking element 5 has free ends 5a, 5b which are arranged so as to enter the slots 17, 17a, and project into the bore 14, when the locking element 5 is mounted on the unit connector 4.

In assembling the above-mentioned parts, the free ends 5a, 5b of the locking element 5 are first inserted into the slots 17, 17a, with the locking element 5 being located against the shoulder created by the cutdown portion 15. Then the pipe 1 and bushing 3 are inserted into the bore 14. As the pipe 1 and bushing 3 are brought together with the unit connector 4, the latter having the locking element 5 mounted thereon as aforesaid, a conical shoulder 13 of the bushing 3 presses the free ends 5a, 5b of the locking element 5 apart so that pushing-in is readily possible. When the circumferential groove 9 of the bushing 3 lines up with the two slots 17, 17a, the free ends 5a, 5b of the locking ring 5 engage the groove 9, and the plug connection is secured against unintentional loosening.

Webs 71, 71 are arranged circumferentially in the hydraulic unit connector 4 between the slots 17, 17a so as to cause the free ends 5a, 5b to come out of engagement with the slots 17, 17a, and thus also out of the circumferential groove 9 of the bushing 3, when the locking element 5 is turned by 90 degrees, so that the plug connection can be opened in a simple manner.

Figure 2:
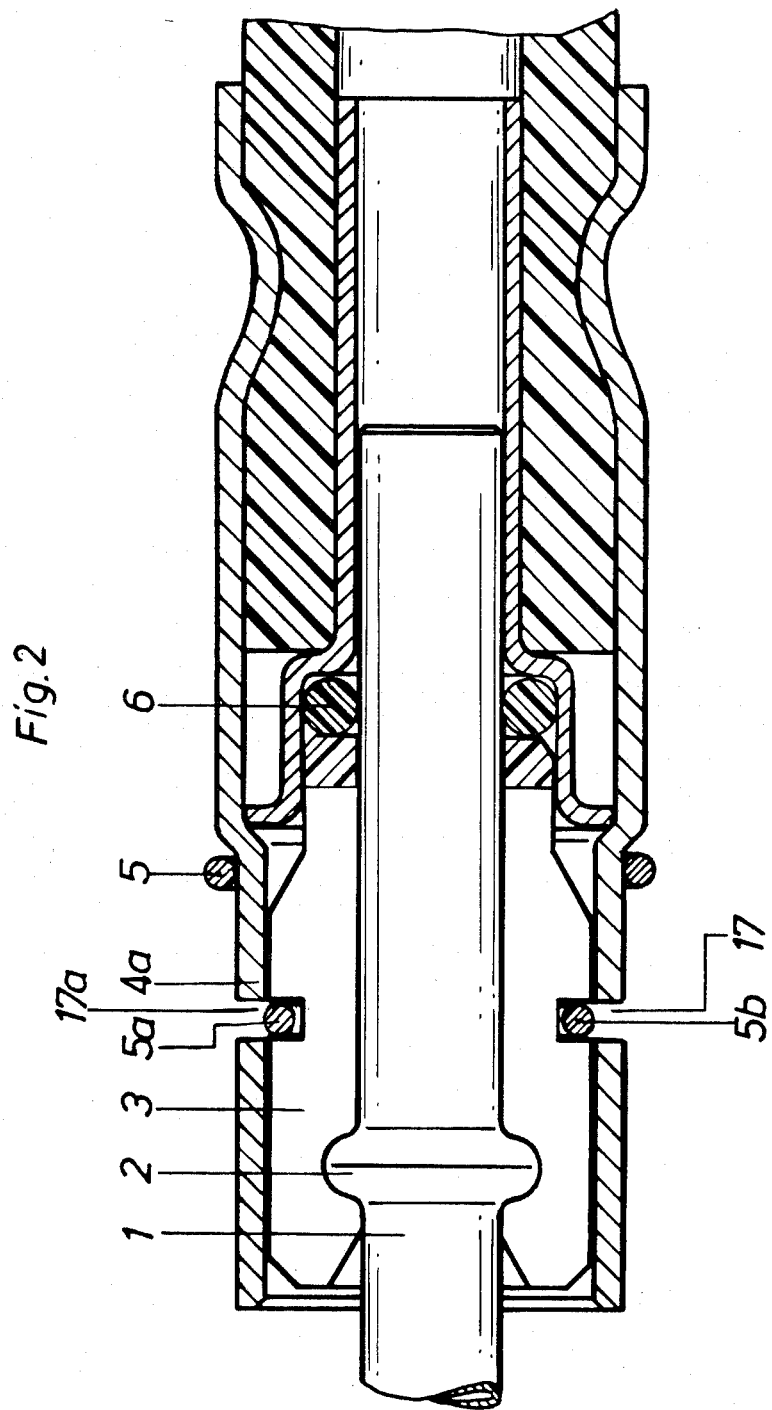
FIG. 2 is a longitudinal cross-section of a plug assembly interconnecting a pipe and a hose fitting.

FIG. 2 shows a plug connection between a pipe 1 and a hose fitting 4a, seen in longitudinal section. Since there is no basic difference from the connection which has been described above, it will not be described further. An additional advantage of this assembly is that it is possible to arrange the sealing element 6 between the nipple of the hose fitting 4a and the pipe 1.

The detachable plug assembly of the invention has the extremely advantageous feature that it automatically establishes the final fixed relationship of the pipe, bushing, locking element, and other elements, regardless of manufacturing tolerances, simply by introducing the pipe 1 sufficiently far into the hose fitting 4a or unit connector 4. Furthermore, as a result of the conical shoulder 13, the fitting performs a self-centering function which makes it possible to make lesser demands on the precision of the mutual positioning of the two parts, so that assembly can be effected by a robot. Furthermore, the precise contour of the bushing 3 holds the sealing element 6 in place, so that even under high pressure the sealing element 6 cannot be displaced, which would lead to leaks.

Figure 4:
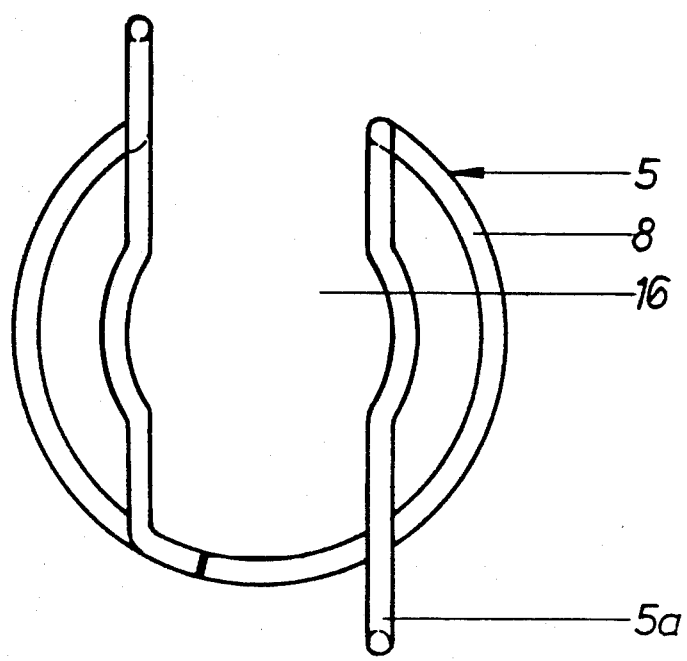
FIG. 4 is a plan view of a locking element for use in the assembly of FIG. 1.
Figure 5:
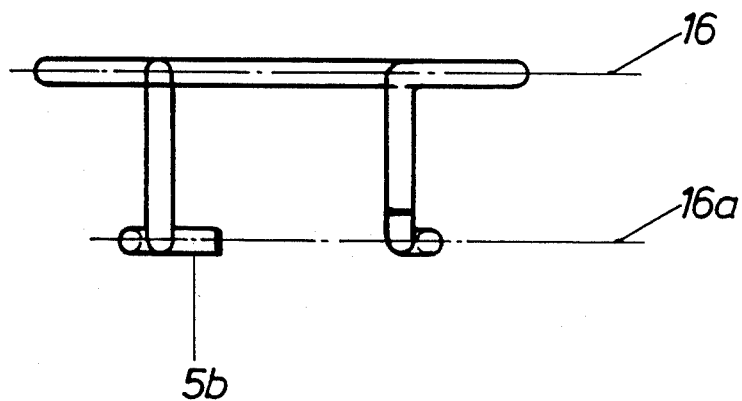
FIG. 5 is a side view of the locking element of FIG. 4.
Figure 6:
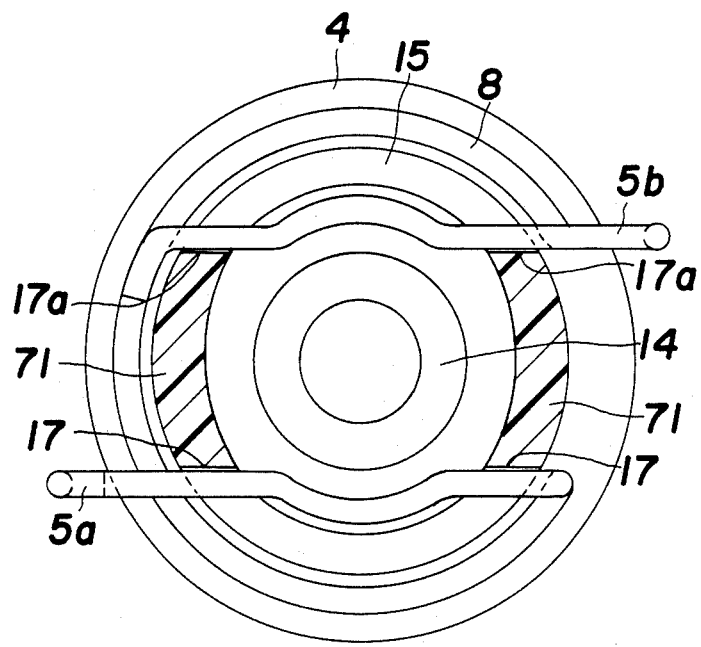
FIG. 6 is a cross-section of the connector taken through line 6—6 of FIG. 1 looking in the direction of arrows 6—6, and showing the connector with the locking element mounted thereon.

FIGS. 4 and 5 show the locking element 5 in plan view and side view, respectively. As seen therein, the locking element 5 is made of spring wire and comprises a main body portion located in a first plane 16, and free ends 5a, 5b located in a second plane 16a. It can be noted in FIGS. 4 and 5 how the spring wire is bent in order to permit the automatic engagement of the bushing to lock the plug connection against loosening.

For this purpose, the wire is shaped as an open circular arc 8 and the two free ends 5a 5b are bent off at a right angle to its theoretical plane 16. By a further right-angle bend the two ends extend parallel to each other in opposite directions in the plane 16a which is parallel to the plane 16. The bends are advantageously so made that part of the spring wire belonging to the end 5b extends beyond the circumference of the circular arc 8 in the plane 16, while another part of the spring wire belonging to free end 5a extends beyond the arc 8 in the plane 16a, so that two diametrical points of attack are created which make it possible to turn the locking element 5 in its seat with the thumb and index finger of one hand.

Although preferred embodiments of the invention have been described herein, it is to be understood that the same is by way of illustration and not of limitation, and that the spirit and scope of the invention are to be considered as defined only by the terms of the claims.

What is claimed is:

1. A detachable plug assembly for retaining a pipe in a bore of an external unit such as a hose fitting, a hydraulic unit connector or the like, the assembly comprising:

a bushing having an axial bore corresponding in size to an outer diameter of the pipe, the bore having an undercut therein for engaging a bead on the pipe to lock the bushing in fixed axial position on the pipe;

the bushing further having a conical shoulder at a forward end thereof for engaging the bore of the external unit and for centering said bushing therein; said bushing further having at least one circumferential groove; and a locking element that is mountable for being retained on the external unit and has at least two diametrically opposed free ends for being inserted intow two corresponding slots in the external unit, the slots communicating with the bore therein, said free ends being displaceable by said conical shoulder and then snapping into said circumferential groove in said bushing when said bushing is inserted into the bore of the external unit, for retaining the pipe in the bore of the external unit;

wherein the external unit has two diametrically opposed circumferential webs interposed between its two slots which, upon rotation of the locking element by 90 degrees, provide for bringing the locking element out of engagement with said two slots and thereby out of engagement with said groove in said bushing, the locking element still being retained on said external unit;

said bushing being slit along its longitudinal axis for expanding of said bushing as it is mounted over said bead on said pipe;

said pipe being turnable in the bushing when the bushing is mounted thereon;

a sealing ring for mounting on a portion of the pipe forward of said bushing for forming a seal between the pipe and the external unit;

said pipe having a second bead on a forward portion thereof for retaining the sealing ring thereon.

2. An assembly as in claim 1, wherein the locking element automatically locks the bushing in precisely defined position in the external unit.

3. An assembly as in claim 2, wherein an inner contour of the external unit is shaped to correspond to an outer contour of the bushing when the bushing is retained in the external unit.

4. An assembly as in claim 1, wherein the webs are integral with the external unit.

* * * * *